US011025604B2

(12) United States Patent
Kreiner et al.

(10) Patent No.: US 11,025,604 B2
(45) Date of Patent: *Jun. 1, 2021

(54) METHODS AND APPARATUS FOR PROVIDING ACCESS TO A SERVICE

(71) Applicant: AT&T Intellectual Property I, L.P., Atlanta, GA (US)

(72) Inventors: Barrett Kreiner, Woodstock, GA (US); Jonathan Reeves, Roswell, GA (US); Ryan Schaub, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/135,772

(22) Filed: Sep. 19, 2018

(65) Prior Publication Data

US 2019/0036898 A1    Jan. 31, 2019

Related U.S. Application Data

(63) Continuation of application No. 14/753,994, filed on Jun. 29, 2015, now Pat. No. 10,084,766, which is a
(Continued)

(51) Int. Cl.
*H04L 29/06* (2006.01)
*H04L 12/18* (2006.01)
*H04L 12/761* (2013.01)

(52) U.S. Cl.
CPC ............ *H04L 63/08* (2013.01); *H04L 12/185* (2013.01); *H04L 12/1845* (2013.01); *H04L 45/16* (2013.01); *H04L 63/14* (2013.01)

(58) Field of Classification Search
CPC . H04L 12/1845; H04L 63/101; H04L 12/185; H04L 45/16; H04L 63/08; H04L 63/14
See application file for complete search history.

(56) References Cited

U.S. PATENT DOCUMENTS 848,669 A     4/1907   Howard
6,310,661 B1  10/2001  Arsenault
(Continued)

OTHER PUBLICATIONS

"Multicast Listener Discovery (MLD)," Retreived on Oct. 18, 2010 from "http://msdn.microsoft.com/en-us/library/ms882958(printer).aspx," Microsoft Corporation, 2010 (2 pages).
(Continued)

*Primary Examiner* — Harunur Rashid
(74) *Attorney, Agent, or Firm* — Hartman & Citrin LLC (57) ABSTRACT

Methods and apparatus for providing access to a service are disclosed. An example apparatus includes at least one processor, and memory including machine readable instructions that, when executed, cause the at least one processor to perform operations including, in response to receipt of a first network communication, retrieve a first list identifying multicast group memberships of a device existing at a first time, the first list retrieved from a storage device based on an identifier in the first network communication, the first network communication including a second list identifying multicast group memberships of the device existing at a second time later than the first time. The device is authenticated based on a comparison of the first list to the second list. A second network communication is transmitted indicating the device has been authenticated in response to the authentication.

20 Claims, 9 Drawing Sheets

Related U.S. Application Data continuation of application No. 12/963,504, filed on Dec. 8, 2010, now Pat. No. 9,077,644.

(56) References Cited

U.S. PATENT DOCUMENTS

| | | | |
|---|---|---|---|
| 6,633,765 B1 | 10/2003 | Maggenti | |
| 7,089,211 B1 | 8/2006 | Trostle et al. | |
| 7,185,199 B2 | 2/2007 | Balfanz et al. | |
| 7,333,488 B2 | 2/2008 | Sumiyoshi | |
| 7,454,518 B1* | 11/2008 | Cain | H04L 12/1854 709/227 |
| 7,477,654 B2 | 1/2009 | Murray et al. | |
| 7,983,205 B1 | 7/2011 | Blease et al. | |
| 2002/0091926 A1 | 7/2002 | Fukutomi | |
| 2003/0061315 A1 | 3/2003 | Jin | |
| 2005/0044356 A1 | 2/2005 | Srivastava et al. | |
| 2005/0195816 A1 | 9/2005 | Sumiyoshi | |
| 2006/0126556 A1* | 6/2006 | Jiang | H04W 4/06 370/328 |
| 2006/0233171 A1 | 10/2006 | Murray et al. | |
| 2009/0046614 A1 | 2/2009 | Lewis et al. | |
| 2009/0059935 A1 | 3/2009 | Dec | |
| 2009/0165091 A1 | 6/2009 | Liang | |
| 2010/0081417 A1 | 4/2010 | Hickie | |
| 2010/0272103 A1 | 10/2010 | Ananthanarayanan et al. | |
| 2010/0278336 A1 | 11/2010 | Tahan et al. | |
| 2011/0142042 A1 | 6/2011 | Field | |
| 2011/0158208 A1 | 6/2011 | Solanki et al. | |
| 2011/0182225 A1* | 7/2011 | Song | H04W 76/40 370/312 |
| 2012/0075998 A1 | 3/2012 | Shah et al. | |
| 2012/0144440 A1 | 6/2012 | Sun et al. | |
| 2012/0185897 A1* | 7/2012 | Gould | H04L 67/18 725/33 |
| 2015/0304298 A1 | 10/2015 | Kreiner et al. | |

OTHER PUBLICATIONS

Deering et al. "Multicast Listener Discovery (MLD) for IPv6," Network Working Group, Request for Comments: 2710, Oct. 1999 (23 pages).

Hiden et al. "IP Version 6 Addressing Architecture," Network Working Group, Request for Comments: 4291, Feb. 2006 (26 pages).

Conta et al. Internet Control Message Protocol (ICMPv6) for the Internet Protocol Version 6 (IPv6) Specification, Network Working Gorup, Request for Comments :4443 , Mar. 2006 (25 pages).

Cisco. "IPv6 Multicast At-A-Glance," Cisco Systems, Inc. 2005. (1 page).

Hinden et al. "IP Version 6 Addressing Architecture," Network Working Group, Request for Comments: 2373, Jul. 1998 (26 pages).

B. Haberman. "Allocation Guidelines for IPv6 Multicase Addresses," Network Working Group, Request for Comments: 3307, Aug. 2002 (8 pages).

United States Patent and Trademark Office, "Restriction Requirement", issued in connection with U.S. Appl. No. 12/963,504, dated Mar. 29, 2013 (8 pages).

United States Patent and Trademark Office, "Non-Final Office Action", issued in connection with U.S. Appl. No. 12/963,504, dated May 29, 2013 (12 pages).

United States Patent and Trademark Office, "Final Office Action", issued in connection with U.S. Appl. No. 12/963,504, dated Dec. 2, 2013 (13 pages).

United States Patent and Trademark Office, "Non-Final Office Action", issued in connection with U.S. Appl. No. 12/963,504, dated Apr. 22, 2014 (14 pages).

United States Patent and Trademark Office, "Final Office Action", issued in connection with U.S. Appl. No. 12/963,504, dated Oct. 2, 2014 (16 pages).

United States Patent and Trademark Office, "Notice of Allowance", issued in connection with U.S. Appl. No. 12/963,504, dated Mar. 2, 2015 (15 pages).

United States Patent and Trademark Office, "Non-Final Office Action," issued in connection with U.S. Appl. No. 14/753,994. dated Sep. 20, 2016, 15 pages.

United States Patent and Trademark Office, "Final Office Action," issued in connection with U.S. Appl. No. 14/753,994, dated Mar. 29, 2017, 16 pages.

United States Patent and Trademark Office, "Non-Final Office Action," issued in connection with U.S. Appl. No. 14/753,994, dated Sep. 7, 2017, 25 pages.

United States Patent and Trademark Office, "Notice of Allowance and Fee(s) Due," issued in connection with US. Appl. No. 14/753,994, dated May 23, 2018, 15 pages.

* cited by examiner

METHODS AND APPARATUS FOR PROVIDING ACCESS TO A SERVICE

RELATED APPLICATION

This patent arises from a continuation of U.S. patent application Ser. No. 14/753,994, now U.S. Pat. No. 10,084, 766, which was filed on Jun. 29, 2015, which is a continuation of U.S. patent application Ser. No. 12/963,504, now U.S. Pat. No. 9,077,644, which was filed on Dec. 8, 2010. U.S. patent application Ser. No. 14/753,994 and U.S. patent application Ser. No. 12/963,504 are hereby incorporated herein by reference in its entireties. Priority to U.S. patent application Ser. No. 14/753,994 and U.S. patent application Ser. No. 12/963,504 is hereby claimed.

FIELD OF THE DISCLOSURE

This disclosure relates generally to network communication, and, more particularly, to methods and apparatus for communicating with groups of devices sharing an attribute.

BACKGROUND

Network devices are typically addressed uniquely within the network in which they are presently located. Currently, network addressing is typically performed using Internet Protocol version 4 (IPv4). IPv4 has a limited address space (e.g., $2^{32}$ addresses). Because of this limited address space, routing techniques such as network address translation (NAT) are used to route messages from outside of a network to inside a network. Using NAT is not always trivial. A requested device may not always be addressed as if it was local to a message transmitting device. Internet Protocol version 6 (IPv6) provides a much larger address space (e.g., $2^{128}$ addresses) than IPv4. Thus, routing techniques such as NAT are not required in IPv6, and all devices can be addressed as if they were local to the message transmitter. Devices operating in accordance with the IPv6 protocol can acquire multiple addresses, and multiple devices can respond to the same address.

DETAILED DESCRIPTION

Example systems disclosed herein address groups of network device(s) based on one or more attributes of the same. For instance, a network host such as a service provider may broadcast a multicast Internet Protocol version 6 (IPv6) address associated with an attribute of devices it wishes to contact (e.g., to update, to determine a market penetration, to broadcast an emergency alert, etc.). Example attributes of the network device may include a device manufacturer, a device location, a point of sale, a distribution point, a past location, a current location, a service available to the device, etc.

For example, when a device is manufactured, a manufacturer may broadcast a message causing the device to join a multicast group associated with a model number of the device. The device may later acquire one or more additional multicast addresses. For example, when traveling from network to network (or through a product distribution chain), the device may gain new multicast group addresses by listening for invitations to join groups and joining the same either automatically or after obtaining user permission, depending on the application. These addresses are stored in the device and can be used to later communicate with the devices on a selective basis (e.g., to contact all devices located in a particular geographic area as indicated by their membership in a group for that area). Additionally or alternatively, because the list of addresses is created in the device throughout its product life and is at least somewhat unique to the device, the list of addresses can be used to authenticate the device.

In some example systems, the devices are structured to listen for invitations to join multicast groups wherein they are coupled to a network. To facilitate communication with select groups of devices a network host may periodically or a-periodically broadcast a message(s) via a network (e.g., a WiFi network, a cellular network, etc.) instructing the device(s) having one or more specified attributes to join a multicast group associated with the one or more attributes. The multicast group may be associated with a location such as, for example, a zip code of the network, a town of the network, a State of the network, etc. or with any other attribute (e.g., a service provider, a model type, etc.)

In some examples, service providers communicate with device(s) to invite devices to join multicast groups irrespective of the attributes of the device. For example, service providers providing broadcasted services (e.g., Internet television, Internet radio, etc.), may instruct a device of a customer to associate with a multicast group based on a level of service or services purchased by the customer. Thus, the service provider may thereafter transmit their services as a multicast message to the multicast group associated with the service.

When a message is to be transmitted to a group of interest, the service provider/host transmits a message to the multicast address. Routers receive the message and access their databases to identify device(s) associated with the multicast address. The messages are relayed to those device(s) that are associated with the multicast address. Any device associated with the multicast group thus receives and processes the message (e.g., performs an action based on the received message, such as, for example performing an update, prompting a user, etc.).

In some examples, any device may join any group (e.g., any device can become a member of any group). However, to prevent malicious access to groups (e.g., joining a group associated with a paid service without paying), a public/private key system may be used. The broadcast messages may be encrypted before transmission, such that only devices with the private key (which is used to decrypt the message) may access invitations to join the multicast group and/or messages to the multicast group. In some examples, the private key is transmitted to the device along with the broadcast message requesting that devices on the local network join the multicast group. Alternatively, the private key may be provided separately to a user of the device so that the user may enter the private key via a user interface of the device.

Further, since each device may accumulate (e.g., become associated with) multiple multicast groups, the multicast groups may be used to form a device signature or fingerprint that may be used as a security measure. More specifically, over time, a given device will associate with many different multicast groups, and therefore, the device becomes identifiable, perhaps uniquely, by the associations it has obtained.

The associations that have been acquired may be used in connection with a security procedure for gaining access to a service. For example, when signing up for an account from a service provider (e.g., an account at a bank, an account at a website, a paid broadcast service, etc.), the device may provide a list of current multicast group memberships. The list of current group memberships are stored at the service provider. When the device later attempts to access the service, the service provider queries the device for its current group memberships and determines if the previous memberships are the same or a subset of the current memberships. If the previous memberships are the same or a subset of the current memberships, the device is permitted to access the account. If the previous memberships are not the same or a subset of the current memberships, the device may be denied access and/or additional credentials may be requested. The credentials stored at the service provider may be updated by the device at a later time to provide enhanced security.

To increase the likelihood of unique identification, some example methods of querying the group memberships include querying additional data associated with the group memberships (e.g., a timestamp of when the group was joined). Based on the group memberships and timestamps of group membership of the device (which were previously stored when the device signed up for the account with the service provider, or updated when the device previously logged in), the service may query the device for a group that was joined at a particular time (e.g., "what group was joined on Monday, Nov. 1, 2010 at 12:53 PM?"). If the device responds with the correct group, the device may be permitted to access the account. If the device does not respond correctly, the device may be denied access or additional credentials may be requested.

Figure 1:
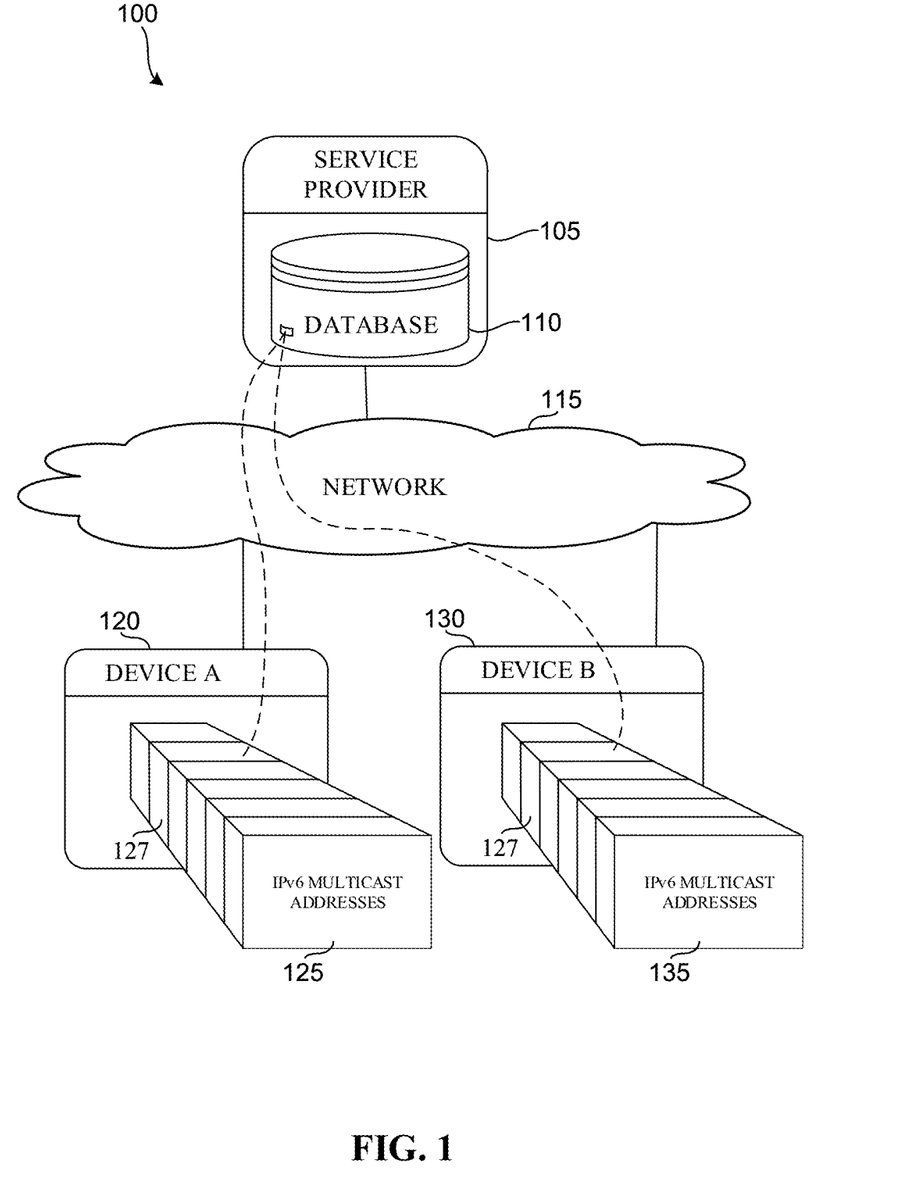
FIG. 1 is a block diagram of an example system for communicating with groups of devices.

FIG. 1 is a block diagram of an example system 100 for communicating with groups of devices having an attribute in common. The example system 100 of FIG. 1 includes a service provider 105, a service provider database 110, a network 115, a first device 120, and a second device 130. The devices 120, 130 may be implemented by any type of electronic device capable of interacting with a network. The first device 120 includes a first list of multicast addresses 125, and the second device 130 includes a second list of multicast addresses 135. In the illustrated example, a multicast address 127 corresponding to an address in the service provider database is included within both the first and the second lists of multicast addresses 125, 135. The multicast address 127 is associated with a first multicast group. Thus in the example of FIG. 1, both the first and the second devices 120, 130 are members of the first multicast group.

The service provider 105 of the illustrated example provides one or more services to the devices 120, 130. In some examples, the service provider is a device manufacturer producing a device (e.g., the device 120 and/or 130) that is sold to an end user. While manufacturing the device, the device manufacturer may cause the manufactured device to join a multicast group associated with a model identifier (e.g., a model number) of the manufactured device. Since, in some examples, the device will retain the multicast group information indefinitely, the membership in their multicast group ensures the device manufacturer will be able to communicate with the manufactured device after the device has left the manufacturer. Such communication may be useful to provide updates and/or notices of updates to the device.

In other examples, the service provider 105 is a location based service provider that provides location based services and/or alerts to devices physically present in a geographic region. For example, a device having a cellular radio may connect to multiple network access points such as, for example, cellular towers. Each cellular tower may be associated with a multicast group, such that any device in communication with the cellular tower is requested to join the multicast group. Additionally or alternatively, the cellular tower may be associated with a multicast group representing a larger geographic region or municipality (e.g., a town, a zip code, a county, a state, a country, etc.). Further, the cellular tower may be associated with multiple multicast groups. The service provider 105 may then transmit a message to device(s) 120, 130 associated with a specific geographic location of interest. The message may contain information such as a weather update (e.g., a severe weather alert), or might be related to an event occurring in the geographic region (e.g., an evacuation due to a forest fire, a reverse 911 call, etc.). In such examples, the message may cause the device 120, 130 to present a message to a user.

In other examples, the service provider 105 provides a broadcast service such as, for example, an Internet Protocol Television (IPTV) broadcast. Broadcasted content is sent to the multicast group via the multicast address 127, and consequently any devices 120, 130 associated with the multicast group will receive the content. The devices 120, 130 may then display the content to a user. Multiple multicast groups may be used by the service provider 105, such that varying levels of service or different types of broadcast content are transmitted to different multicast groups. Of course, any other type of service may be provided by the service provider such as, for example, user account services, network communication services, etc.

In some examples, the multicast group may represent a user based group. The user may add the multicast group to any device(s) 120, 130 that they use, causing all devices 120, 130 used by the user to be addressable via a single address. The multicast address 125, 135 may then be used on each device 120, 130 to ensure that user settings for a particular service are applied to all devices 120, 130 used by the user (e.g., the user isn't required to re-apply their settings when using a different device 120, 130). In such an example, device(s) 120, 130 might query a user group service provider (or other members and/or devices 120, 130 of the user based group) for settings associated with the user group. When changes to settings on one device 120, 130 within the group are made, the device 120, 130 may transmit a message to the user based group alerting other devices 120, 130 associated with the group of the change.

The service provider database 110 of the illustrated example stores multicast addresses 125, 135 used by the service provider 105. In some examples, the service provider database 110 stores multiple multicast addresses 125, 135 representing multiple multicast groups. For example, a service provider 105 may store multiple multicast addresses 125, 135 each being associated with different geographic regions. In some examples, multicast addresses 125, 135 stored in the service provider database 110 might not be related to the same service or type of service. For example, an IPTV service provider may store multicast addresses 125, 135 associated with different levels of service as well as multicast addresses 125, 135 associated with different device models of devices used to display the IPTV content. The service provider database 110 may be implemented by any device and/or tangible computer readable medium for storing data such as, for example, flash memory, magnetic media, etc. Furthermore, the data stored in the service provider database 110, may be in any data format such as, for example, binary data, comma delimited data, tab delimited data, structured query language (SQL) structures, etc.

The network 115 of the illustrated example is a public network such as, for example, the Internet. However, any other network could be used. For example, some or all of the network 115 may be a company's intranet network (e.g., a private network). Although the network 115 of the illustrated example operates based on the Internet Protocol version 6 protocol (IPv6), the network 115 may additionally or alternatively use any other past, present, or future protocol to enable communication between devices on the network 115. In the illustrated example, IPv6 is used because of the vast addressing space available, particularly for public multicast addresses 125, 135. In particular, the IPv6 protocol allows for 112 bit multicast addresses (of the 128 bits of the IPv6 address) to be used. Accordingly, $1.3 \times 10^{36}$ multicast addresses (and thereby multicast groups) are available for use. The network 115 of the illustrated example routes multicast messages 125, 135 associated with a multicast group to devices 120, 130 associated with the multicast group via a multicast listener discovery (MLD) protocol. However, any other protocol for routing multicast messages 125, 135 may additionally or alternatively be used.

The devices 120, 130 of the illustrated example may be implemented by any type of electronic devices capable of communicating with a network, such as cellular phones, WiFi enabled devices, Bluetooth enabled devices, laptop computers, desktop computers, internet appliances, set top boxes, gaming devices, mobile devices, consumer electronics, etc.

The lists of multicast addresses 125, 135 of the illustrated example each include six multicast addresses 125, 135 thereby representing memberships in six different groups. However, any number of multicast addresses 125, 135 might be stored. Further, the number of multicast addresses 125, 135 is not necessarily the same across devices 120, 130. In fact, different devices 120, 130 will typically have a different list of multicast addresses 125, 135. The multicast addresses 125, 135 of the illustrated example are IPv6 multicast addresses, however any other type of address may additionally or alternatively be used.

Figure 1A:
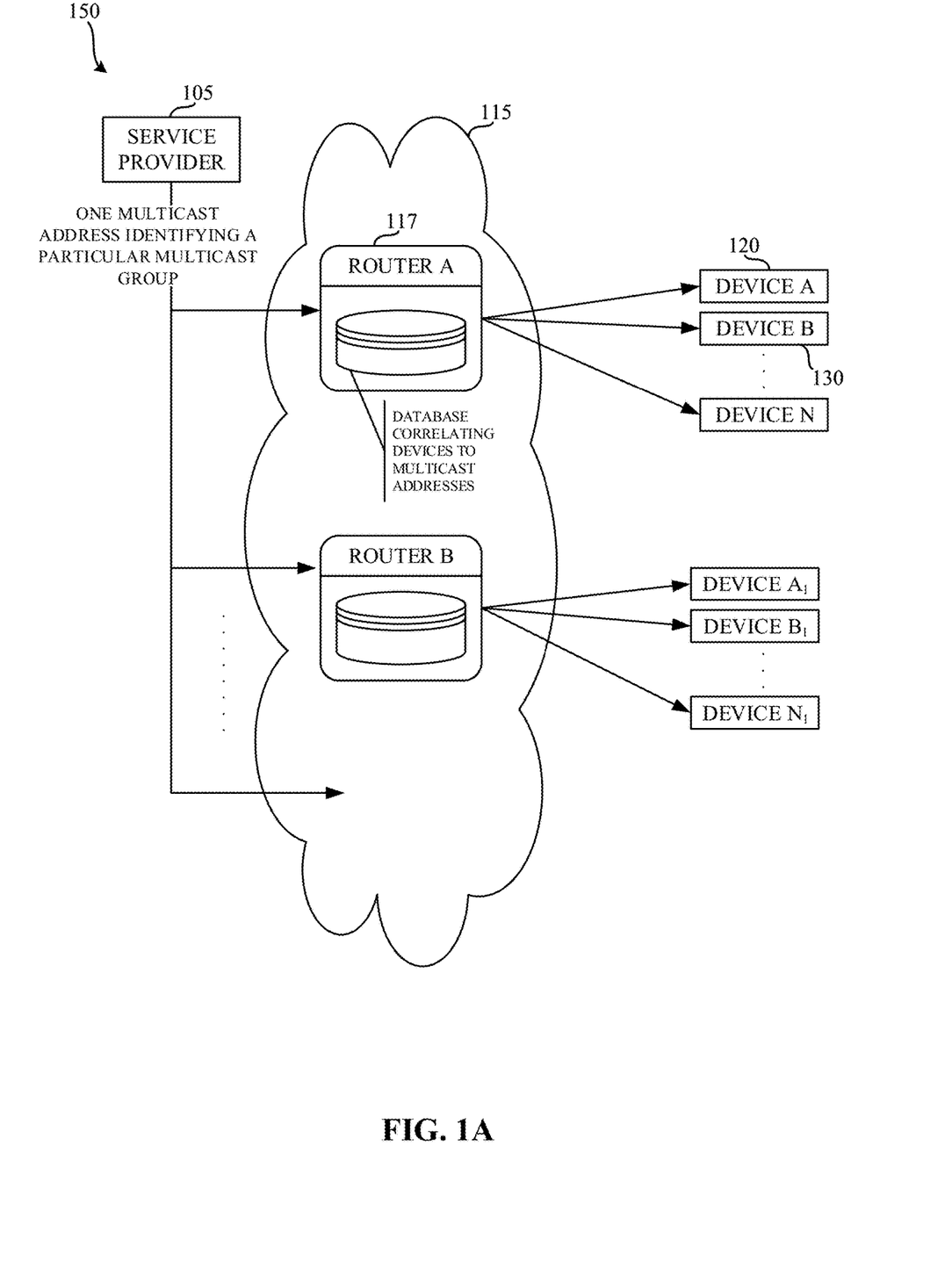
FIG. 1A is a block diagram of an example system for routing communications to groups of devices.

FIG. 1A is a block diagram of an example system 150 for routing communications to groups of devices. The example system 150 of FIG. 1A includes the service provider 105, the network 115, a router 117, the first device 120, and the second device 130. In the illustrated example, the service provider 105 transmits content destined to a multicast address which is associated with a multicast group. The message is broadcast from the service provider 105 and received by the router 117. In the illustrated example, two routers are shown. However, there may be any number of routers. For example, three routers, one hundred routers, or thousands of routers may be used. The router 117 relays the multicast message to the devices 120, 130 when the router 117 is aware of device membership in the multicast group. To inform the router 117 of the membership in the multicast group, the device 120, 130 advertises membership in the multicast group. The router 117 stores the membership in a multicast routing database. When multicast messages are received, the router 117 consults the multicast routing database to determine if the message should be relayed. If the membership is stored in the multicast routing database, the router 117 relays the message to all devices associated with the multicast group. If the membership is not stored in the multicast routing database, the router 117 does nothing.

Figure 2:
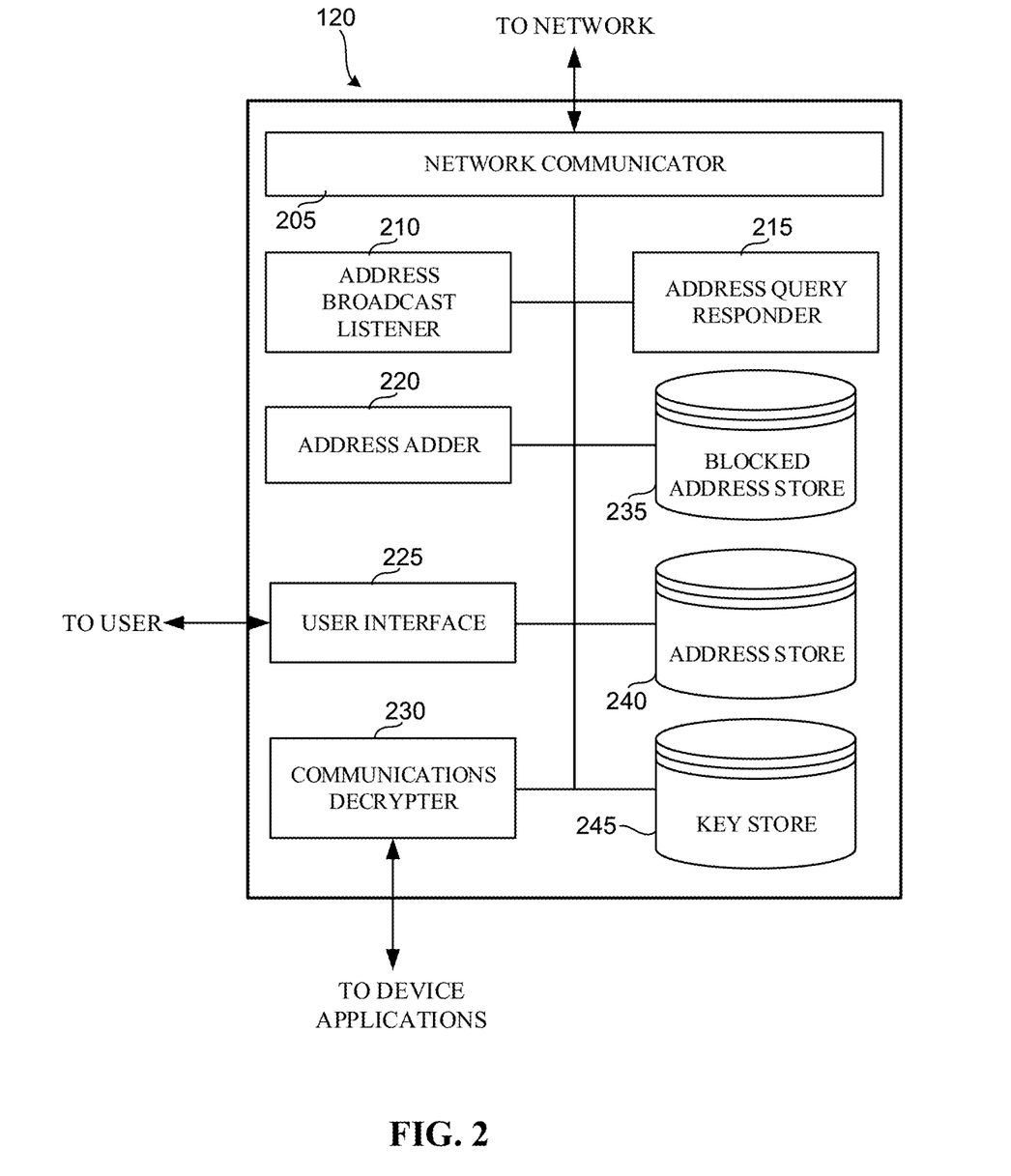
FIG. 2 is a block diagram illustrating an example user device of the system for group multicast of FIG. 1.

FIG. 2 is a block diagram illustrating an example device 120 of the system 100 of FIG. 1. The block diagram of FIG. 2 could likewise represent the device 130, but for simplicity will be discussed with reference to device 120. The example device 120 of the illustrated example includes a network communicator 205, an address broadcast listener 210, an address query responder 215, an address adder 220, and an address store 240. The example device 120 of the illustrated example additionally includes a key store 245, a communications decrypter 230, a user interface 225, and a blocked address store 235.

The network communicator 205 of the illustrated example receives and transmits network communications via a network such as network 115. In the illustrated example, the network communicator 205 is a WiFi 802.11x wireless network port. However, any other type of network interface may be used. For example, a wired Ethernet network port, a Bluetooth network adapter, or a cellular modem may be used. Additionally or alternatively, there may be multiple network interfaces in any combination of types of interfaces.

The address broadcast listener 210 of the illustrated example monitors network communications received by the network communicator 205 for multicast group advertisements. The address broadcast listener 210 monitors communications for multicast group advertisements over an Internet Control Message Protocol version 6 (ICMPv6). However, any other protocol may additionally or alternatively be used to listen for multicast group advertisements.

The address store 240 of the illustrated example stores a multicast address representative of a multicast group. In some examples, multiple multicast addresses will be stored in the address store 240. Additionally, other data may be stored in the address store 240, such as information associated with the multicast group (e.g., a type of the group, a timestamp indicating when the group was joined, etc.).

The address adder 220 of the illustrated example adds the multicast address to the address store 240 in response to multicast group advertisements received via the address broadcast listener 210. In some examples, the address adder 220 adds the multicast address to the address store 240 after receiving approval via a received user input. However, in other examples the address adder 220 adds the multicast address to the address store 240 without prompting the user. The address adder 220 might determine that the user does not need to be prompted for particular types of multicast groups. For example, the address adder 220 might request permission before joining an IPTV broadcast multicast group, but might not request permission before joining a location based services multicast group. Further, the types of multicast groups that the address adder 220 might request user permission for may be configured by a user via the user interface 225. In addition, the address adder 220 may add other data associated with the multicast group to the address store 240 such as, for example, a timestamp of when the multicast group was joined, etc.

The address query responder 215 of the illustrated example responds to requests for addresses stored in the address store 240. The address query responder 215 of the illustrated example responds to requests via the MLD protocol. However any other protocol may additionally or alternatively be used.

In the example of FIG. 2, the key store 245 stores a private key associated with the multicast address received via the address broadcast listener 210. In some examples, communication to the multicast group is encrypted. For example, an IPTV broadcaster may wish to encrypt broadcast communications so that only recipient devices with the appropriate private key can decrypt the communications. In the illustrated example, the private keys stored in the key store 245 are received via the address broadcast listener 210. However, the private key may additionally or alternatively be received via the user interface 225.

The communications decrypter 230 of the illustrated example decrypts communications to the device using the private key associated with the multicast address. In the illustrated example, content broadcasters encrypt communications to prevent unauthorized access. However, in other examples, the broadcasted communications may form a virtual private network (VPN). For example, a device on a multicast VPN may receive communications for that virtual network. Devices communicating within the VPN transmit encrypted communications to the multicast group, which can then be decrypted by devices in the multicast group.

The user interface 225 of the illustrated example receives input(s) from, and displays message(s) to a user. In the illustrated example, messages displayed to the user include requests for permission to join a multicast group, a listing of current group memberships, etc. Multicast groups may be joined via the user interface 225, where, for example, a user enters a multicast address of the multicast group. Further the user might additionally or alternatively use the user interface 225 to provide a private key for use by the communications decrypter 230. Additionally or alternatively, the user interface 225 may add groups that are stored in a memory such as, for example, a memory card. However, any other approach to input multicast group information may additionally or alternatively be used. For example, a multicast address for a user based group may be read and/or calculated based on a biometric identification of a user of the device (e.g., via a fingerprint reader).

Figure 4:
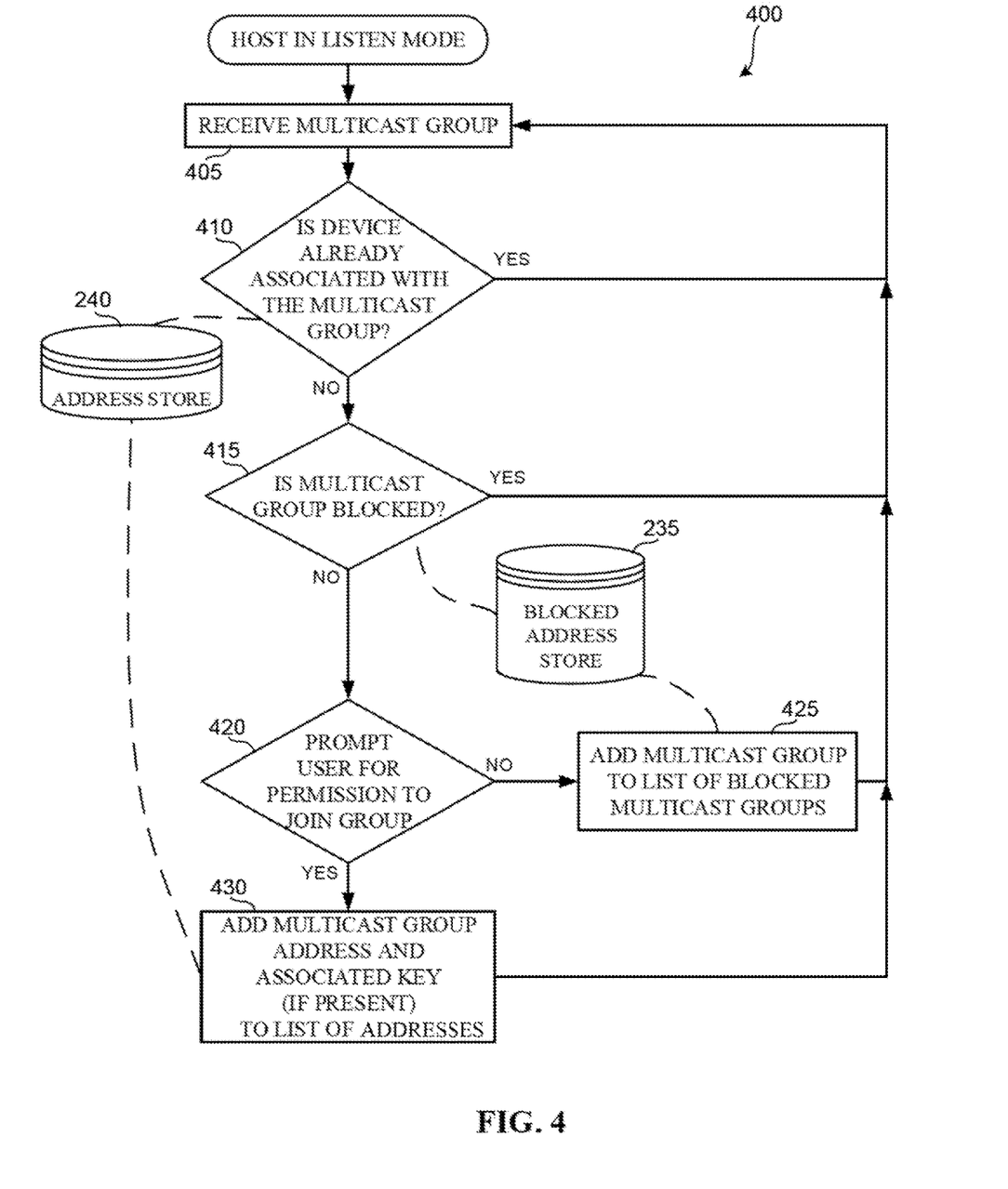
FIG. 4 is a flowchart representative of example machine-readable instructions that may be executed to implement the example device of FIG. 1.

The blocked address store 235 of the illustrated example stores a list of multicast addresses that the address adder 220 will not add to the address store 240. During the address association process (an example of which is shown in FIG. 4), the user interface 225 prompts a user for permission to join a multicast group that has not already been joined and is not blocked. If the user denies permission, the address adder 220 adds the multicast address to the blocked address store 235, causing the address to not be associated with the device 120, 130. In some examples, this do-not-join list may include a period of time in which the user is not to be prompted for permission to join the multicast group. For example, the user may not want to join a multicast group at the present time, but might grant permission to join the group if it is seen again at a later date (e.g., more than one week later). Any period of time could be used between permission requests, and/or the multicast group may be blocked indefinitely.

The address store 240, the key store 245, and/or the blocked address store 235 of the illustrated example may be implemented by any device and/or computer readable medium for storing data such as, for example, flash memory, magnetic media, etc. Furthermore, the data stored in the address store 240, the key store 245, and/or the blocked address store 235 may be in any data format such as, for example, binary data, comma delimited data, tab delimited data, structured query language (SQL) structures, etc. Additionally the address store 240, the key store 245, and/or the blocked address store 235 may be stored in the same database or in separate databases.

Figure 3:
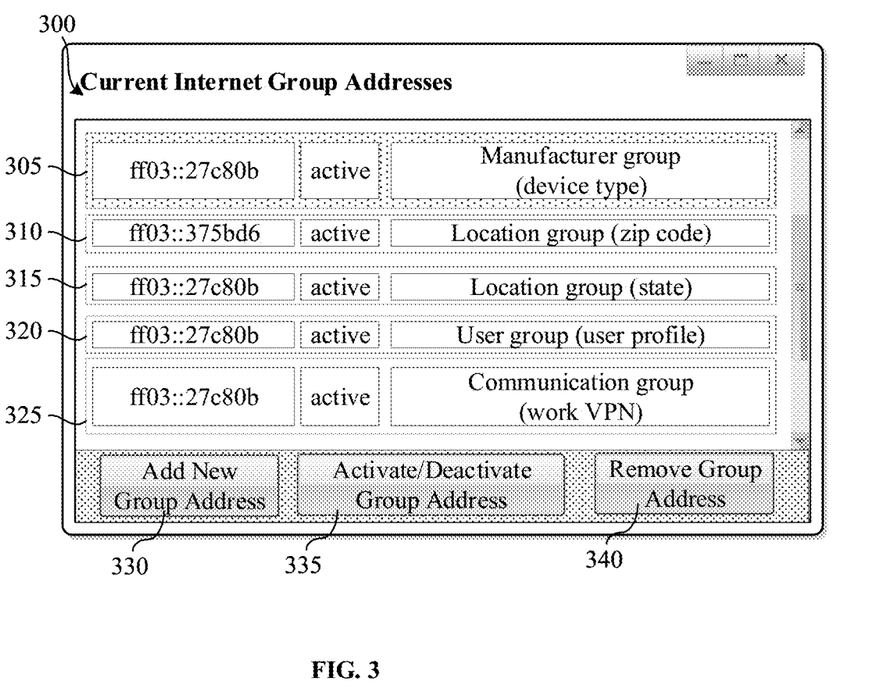
FIG. 3 is an example interface of the example device of FIG. 2.

FIG. 3 illustrates an example interface 300 of the example device 120 of FIGS. 1 and 2. The example interface 300 displays the current multicast group addresses of the device 120. In particular, the example interface 300 displays five multicast group memberships 305, 310, 315, 320, and 325. Any number of group memberships could be displayed in any arrangement. Additionally, the interface allows the user to add new group addresses 330, activate and/or deactivate group addresses 335, and/or remove group addresses 340.

In the example of FIG. 3 the first multicast group membership 305 is for a manufacturer group. The first example multicast group membership 305 is active, meaning that the device will process messages transmitted to the device 120 via the first multicast group membership address 305. The second multicast group membership 310 of the illustrated example is a location group associated with a zip code. The third multicast group membership 315 of the illustrated example is a location group associated with a state. The fourth example multicast group membership 320 of FIG. 3 is a user group associated with a user of the device 120. The fifth example multicast group membership 325 is for a communication group. The fifth multicast group membership 325 is inactive. Therefore, the device 120 will not process messages received via the multicast address associated with the fifth multicast group membership 325.

In the illustrated example, the fifth multicast group membership 325 was added via the interface. In particular, the add new group addresses function was invoked by selecting button 330, wherein the user entered details of the fifth multicast group membership 325 such as, for example, a nature of the multicast group (e.g., communication group, location group, manufacturer group, etc.), an active/inactive status of the group membership, and a multicast address to be associated with the multicast group. The address adder 220 may have then added the fifth multicast group membership 325 to the address store 240.

As noted above, the fifth multicast group membership 325 of the illustrated example is inactive. The user may activate and/or deactivate multicast group addresses by invoking the activate and/or deactivate multicast group addresses function by selecting button 335. This allows a user to determine whether they would like the device 120 to perform actions related to a particular multicast group. For example, a user may deactivate a manufacturer group such as, for example, the first multicast group membership 305 if they did not wish to receive device updates from the manufacturer. While in the illustrated example, multicast addresses are activated and/or deactivated by a user, in some examples, multicast addresses may be activated and/or deactivated automatically. For example, multicast addresses may be automatically disabled after a period of time. The period of time may be user configured, may be based on activity (or inactivity) of the multicast address, etc. Further, certain types of multicast groups may be active only while certain conditions are present. For example, a location type address associated with a physical location may be deactivated when the device is no longer near the location. In other examples, only a single user account group may be used at a single time.

Additionally, addresses may be removed by the user via a remove group address function by selecting button 340. The remove group address function allows the user to remove multicast groups with which they no longer wish to be associated. For example, the device may be a global positioning device in a rental car (e.g., not owned by the user). The user may have added a user account to the rented global positioning device to have personalized suggestions while using the device. Upon completion of usage of the device (e.g., at the end of the rental period), the user may wish to remove their information from the global positioning device so subsequent users are not exposed to and/or have access to their personalization. While in the illustrated example multicast addresses are removed by the user, in some examples, multicast addresses may be removed automatically. For example, multicast addresses may be automatically removed after a period of time. The period of time may be user configured, may be based on activity of the multicast address, may be predefined upon adding the multicast group, etc. For example, a paid broadcast service may be valid for a particular length of time (e.g., the service may have been paid for up until a specific time). Upon the expiration of the service time, the multicast group may be automatically removed.

While an example manner of implementing the group multicast system 100 of FIG. 1 has been illustrated in FIGS. 1, 2, and 3, one or more of the elements, processes and/or devices illustrated in FIGS. 1, 2, and 3 may be combined, divided, re-arranged, omitted, eliminated and/or implemented in any other way. Further, the example network communicator 205, the example address broadcast listener 210, the example address query responder 215, the example address adder 220, the example user interface 225, the example communications decrypter 230, the example blocked address store 235, the example address store 240, the example key store 245, the example device 120, and/or, more generally, the example group multicast system 100 of FIGS. 1 and 2 may be implemented by hardware, software, firmware and/or any combination of hardware, software and/or firmware. Thus, for example, any of the example network communicator 205, the example address broadcast listener 210, the example address query responder 215, the example address adder 220, the example user interface 225, the example communications decrypter 230, the example blocked address store 235, the example address store 240, the example key store 245, the example device 120, and/or, more generally, the example group multicast system 100 of FIGS. 1 and 2 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example network communicator 205, the example address broadcast listener 210, the example address query responder 215, the example address adder 220, the example user interface 225, the example communications decrypter 230, the example blocked address store 235, the example address store 240, the example key store 245, and/or the example device 120 are hereby expressly defined to include a computer-readable medium such as a memory, DVD, CD, etc., storing the software and/or firmware. Further still, the example group multicast system 100 of FIGS. 1 and 2 may include one or more elements, processes and/or devices in addition to, or instead of, those illustrated in FIGS. 1 and 2, and/or may include more than one of any or all of the illustrated elements, processes and devices.

Flowcharts representative of example machine-readable instructions for implementing the example group multicast system 100 are shown in FIGS. 4, 5, 6A, and 6B. In these examples, the machine-readable instructions comprise a program(s) for execution by a processor(s) such as the processor 712 shown in the example computer 700 discussed below in connection with FIG. 7. The program(s) may be embodied in software stored on a computer-readable medium(s) such as a CD-ROM, a floppy disk, a hard drive, a digital versatile disk (DVD), or a memory associated with the processor 712, but the entire program(s) and/or parts thereof could alternatively be executed by a device other than the processor 712 and/or embodied in firmware or dedicated hardware. Further, although the example programs are described with reference to the flowcharts illustrated in FIGS. 4, 5, 6A, and 6B, many other methods of implementing the example group multicast system 100 may alternatively be used. For example, the order of execution of the blocks may be changed, and/or some of the blocks described may be changed, eliminated, or combined.

As mentioned above, the example processes of FIGS. 4, 5, 6A, and 6B may be implemented using coded instructions (e.g., computer-readable instructions) stored on a tangible computer-readable medium(s) such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of FIGS. 4, 5, 6A, and 6B may be implemented using coded instructions (e.g., computer-readable instructions) stored on a non-transitory computer-readable medium(s) such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

FIG. 4 is a flowchart 400 representative of example machine-readable instructions that may be executed to implement the example devices 120 and 130 of FIG. 1. The process of FIG. 4 begins at block 405 when the address broadcast listener 210 of the device 120 receives a message identifying a multicast group. The multicast group identifies an attribute that may be associated with the device 120. For example, the multicast group might identify a model identifier of the device 120. In such an example, the broadcast message may be transmitted before the device 120 leaves a warehouse of a manufacturer, thereby associating all devices having the same model identifier with a multicast group. In such an example, the associations with the group will typically be automatic (e.g., without requiring user permission).

The address adder 220 determines if the device 120 is associated with the multicast group received via the broadcast message by determining if the address of the multicast group is already present in the address store 240 (block 410). If the address of the multicast group is already present in the address store 240, the address broadcast listener 210 awaits further multicast group broadcasts. If the address of the multicast group is not present in the address store 240, the address adder 220 determines if the multicast group is blocked (block 415).

The address adder 220 determines if the multicast group is blocked by determining if the address of the multicast group is present in the blocked address store 235. If the address is present in the blocked address store 235, the address broadcast listener 210 awaits further multicast group broadcasts. If the address is not present in the blocked address store 235, a user may be prompted for permission to join the multicast group (block 420). In some examples, the user might not be asked for permission to join the group. For example, a manufacturer producing devices might not want to have each device prompt for permission to join the group. Alternatively, an emergency or location based service may not want to give users an option to not join the group.

If the user denies permission to join the multicast group, the multicast group is added to the blocked address store 235 by the address adder 220 (block 425). Further, addresses in the blocked address store 235 might be associated with a period of time in which the multicast addresses are to be blocked. For example, the user may deny permission for a given period of time (e.g., they do not want to be asked to join the group for another week).

If the user grants permission to join the multicast group, the address adder 220 adds the address associated with the multicast group to the address store 240 (block 430). In some examples, a private key may be associated with the multicast group. In such examples, the address adder 220 may add the private key to the key store 245. After the multicast group is added, the address broadcast listener 210 continues to wait for broadcast messages advertising multicast groups.

Figure 5:
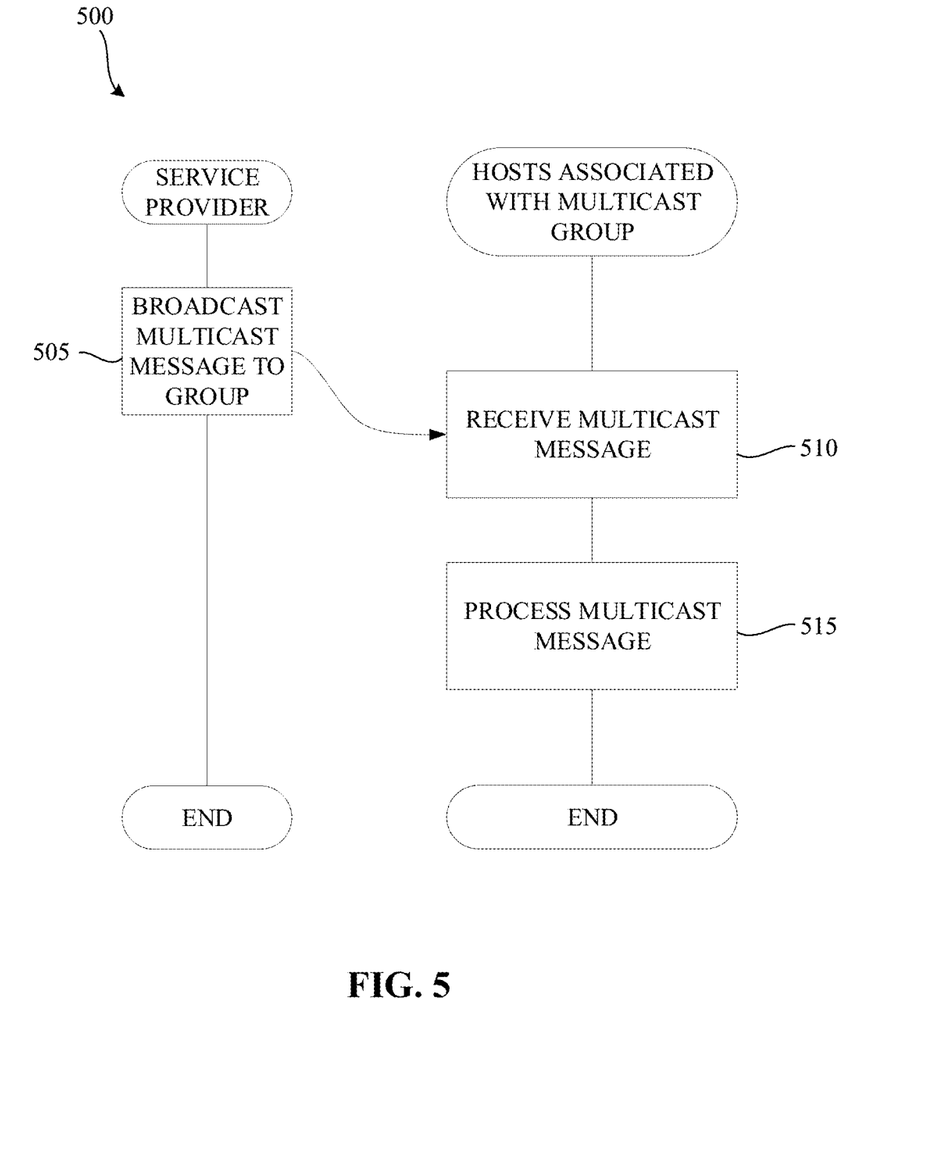
FIG. 5 is a flowchart representative of example machine-readable instructions that may be executed to implement the example group multicast system of FIG. 1.

FIG. 5 is a flowchart 500 representative of example machine-readable instructions that may be executed to implement the example group multicast system 100 of FIG. 1. The process of FIG. 5 assumes that FIG. 4 has occurred such that at least one device has joined a multicast group. The process of FIG. 5 begins at block 505, where the service provider 105 broadcasts a multicast message to the multicast address instructing the members of the multicast group to perform an action (block 505). The broadcast message is then received by the members of the multicast group (block 510). The members of the multicast group then each process the multicast message (block 515). The multicast message may include an action to be performed by the members of the multicast group. For example, the action might include displaying an alert to a user of the recipient device such as, for example, an emergency notification. Further, the action might instruct the members of the multicast group to determine if device updates are available.

Figure 6A:
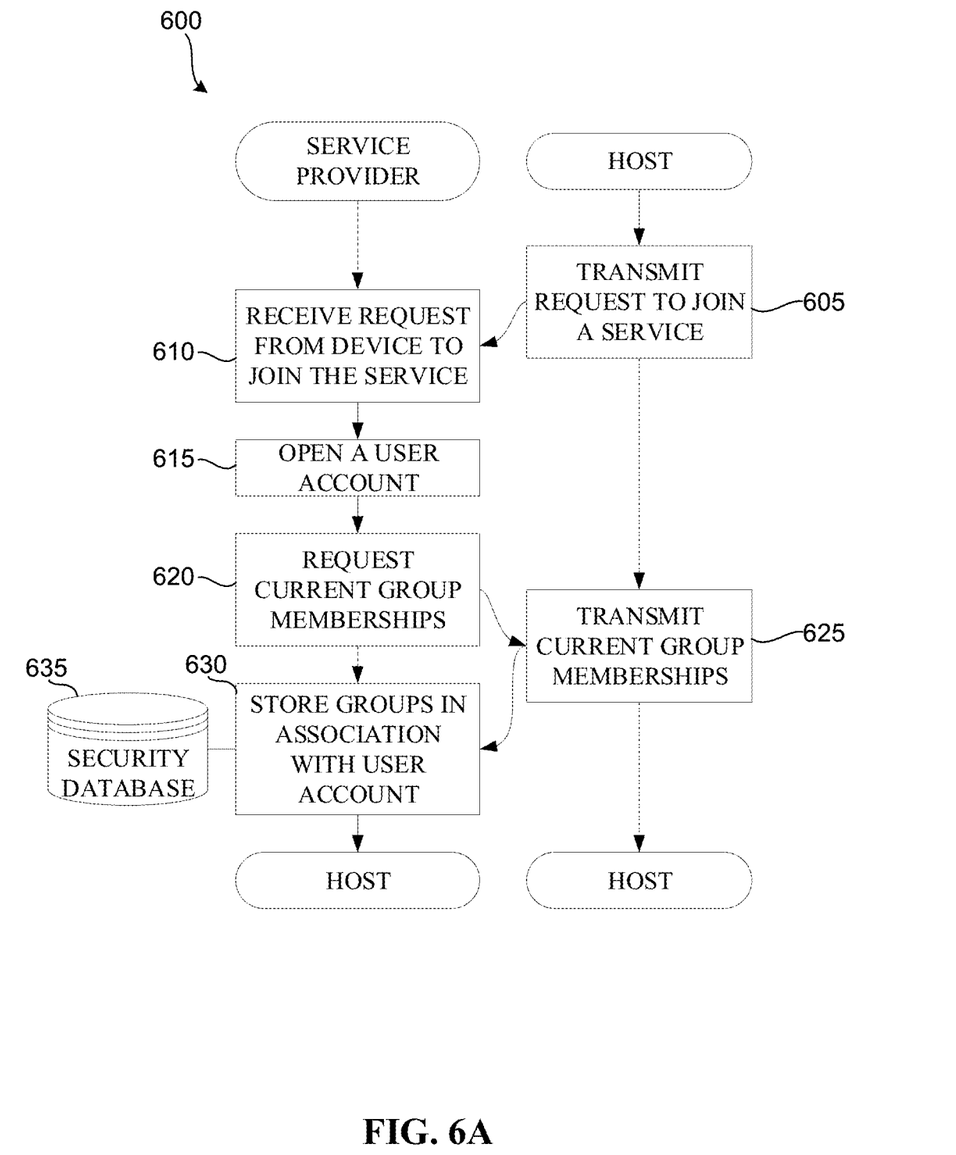
FIG. 6A is a flowchart representative of example machine-readable instructions that may be executed to implement the example group multicast system of FIG. 1.

FIG. 6A is a flowchart 600 representative of example machine-readable instructions that may be executed to implement the example group multicast system of FIG. 1. Since each device accumulates multiple multicast groups, the multicast groups may be used to form a device signature that may be used as a security measure. More specifically, over time, a given device will associate with many multicast groups, and therefore, the device becomes identifiable, perhaps uniquely, by the associations it has obtained. For example, when signing up for a service from a service provider 105 (e.g., an account at a bank, an account at a website, etc.), the device 120 may provide a list of current multicast group memberships. The list of current group memberships are then stored at the service provider 105.

The process of FIG. 6A begins at block 605, where the device 120 transmits a request to join a service provided by the service provider 105 (block 605). The service provider 105 then receives the request to join the service (block 610), and opens a user account associated with a user of the device 120 (block 615). Next, the service provider 105 requests current multicast group memberships from the device 120 (block 620). The address query responder 215 of the device 120 then transmits current group memberships to the service provider 105 (block 625). Additionally, the address query responder 215 may transmit times at which the multicast groups were joined. The service provider 105 then stores the multicast groups in association with the user account in a database.

Figure 6B:
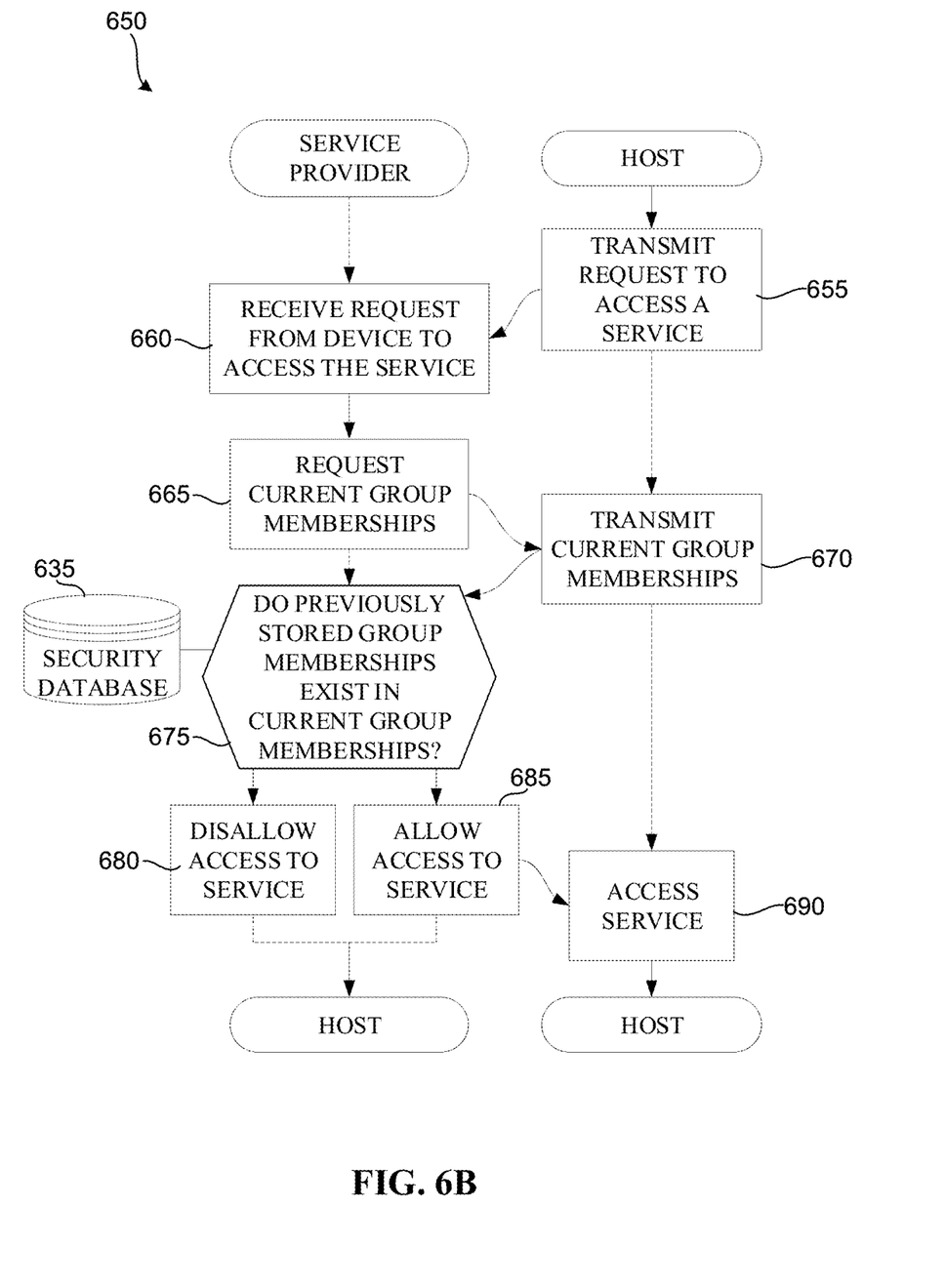
FIG. 6B is a flowchart representative of example machine-readable instructions that may be executed to implement the example group multicast system of FIG. 1.

FIG. 6B is a flowchart 650 representative of a process that may be implemented using example machine-readable instructions that may be executed to implement the example group multicast system of FIG. 1. When the device 120 attempts to access the service that was joined in FIG. 6A, the service provider 105 queries the current group memberships of the device 120 and determines if the previous memberships are a subset of the current memberships, to thereby determine if the device 120 should be allowed to access the service. The process of FIG. 6B begins at block 655, where the device 120 transmits a request to access a service provided by the service provider 105. The service may be accessed when the device 120 attempts to log into the service via, for example, a website. The service provider 105 receives the request from the device to access the service (block 660). Next, the service provider 105 requests the current group memberships of the device 120 (block 665). The address query responder 215 of the device 120 then responds with the current group memberships (block 670).

Because devices 120, 130 that travel from location to location acquire additional group memberships, the service provider 105 can, in many cases, identify (perhaps uniquely) the device 120 based on the group membership history. Further, because when the device 120 signed up for the service through a process similar to the process shown in FIG. 6A, the service provider 105 has a record of previous group memberships. The service provider 105 then determines if the previous group memberships are a subset of the current group memberships (block 675) by consulting the security database 635. If the previous group memberships are a subset of the current group memberships, the service provider 105 may allow access to the service (block 685), and the device 120 may access the service (block 690). Additionally, the service provider 105 may update the previous group memberships to match the current group memberships. If the previously stored group memberships are not a subset of the current group memberships, the service provider 105 may disallow access to the service (block 680). Additionally or alternatively, the service provider 105 may take additional actions to determine if the device 120 should be disallowed access such as, for example, asking for additional credentials.

Additionally or alternatively, the service provider 105 may query additional information about group memberships of the device 120 that may provide additional information necessary for the service provider 120 to uniquely identify the device 120. For example, the service provider 105 may query the device 120 for groups joined on a specific date and/or time. Because this information was previously shared with the service provider 105 (e.g., upon signing up for the service), the service provider 105 can uniquely identify the device 120.

Figure 7:
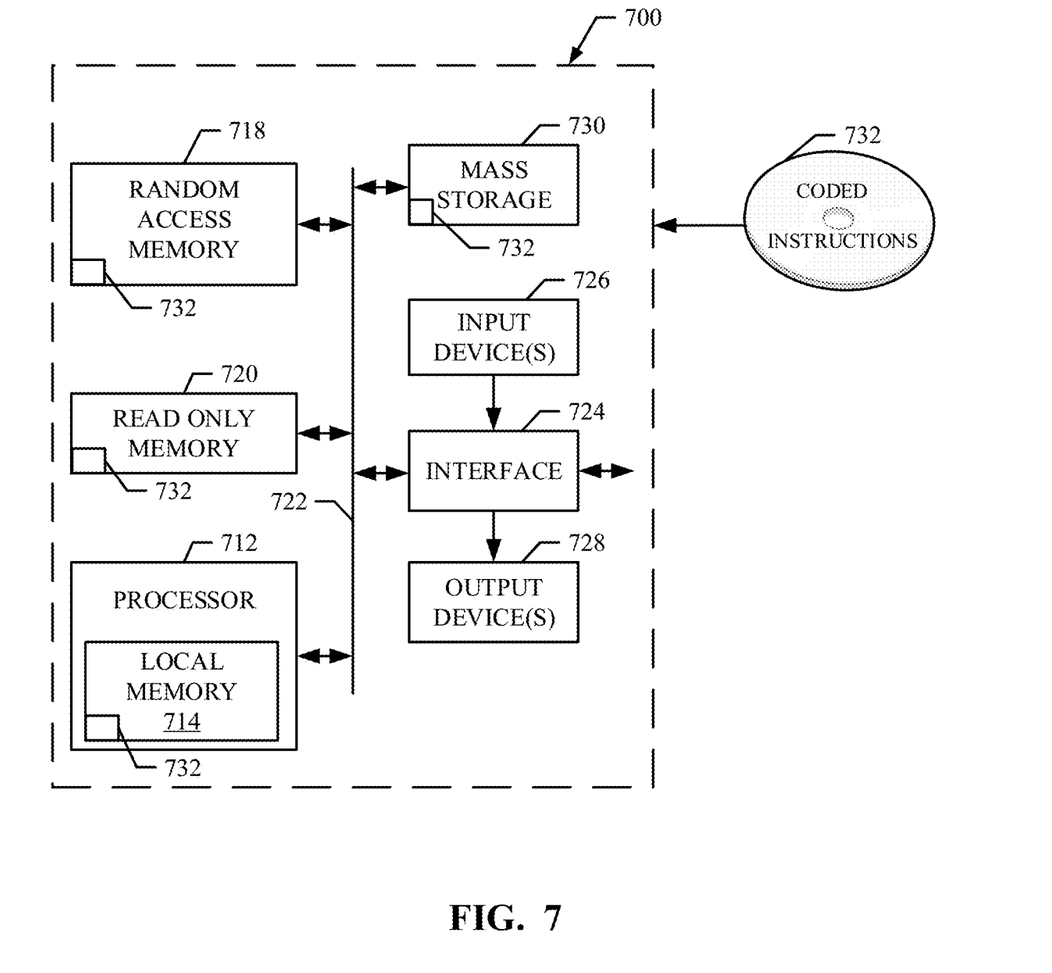
FIG. 7 is a block diagram of an example processor system that may execute the example machine-readable instructions of FIGS. 4, 5, 6A, and 6B to implement the example system and/or device of FIGS. 1 and/or 2.

FIG. 7 is a block diagram of an example computer 700 capable of executing the instructions of FIGS. 4, 5, 6A, and 6B to implement the group multicast system 100 of FIG. 1. The computer 700 can be, for example, a server, a personal computer, a mobile device (e.g., a cellular phone), or any other type of computing device.

The system 700 of the instant example includes a processor 712. For example, the processor 712 can be implemented by one or more Intel® microprocessors from the Pentium® family, the Itanium® family or the XScale® family. Of course, other processors from other families are also appropriate.

The processor 712 is in communication with a main memory 714 including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 714 is typically controlled by a memory controller (not shown).

The computer 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) 726 can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 700 also includes one or more mass storage devices 730 for storing software and data. Examples of such mass storage devices 730 include floppy disk drives, hard drive disks, compact disk drives, and digital versatile disk (DVD) drives.

The coded instructions 732 of FIGS. 4, 5, 6A, and 6B may be stored in the mass storage device 730, in the volatile memory 718, in the non-volatile memory 720, in the local memory 714, and/or on a removable storage medium such as a CD or DVD. The coded instructions 732 of FIG. 7 may be stored in the mass storage device 728, in the volatile memory 714, in the non-volatile memory 716, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one processor; and
   memory including machine readable instructions that, when executed by the at least one processor, cause the at least one processor to perform operations including:
   in response to receipt of a first network communication representing a request for a device to access a service, retrieving a first list identifying multicast group memberships of the device existing at a first time, the first list retrieved from a storage device based on an identifier in the first network communication, the first network communication including a second list identifying multicast group memberships of the device existing at a second time later than the first time,
   authenticating the device for accessing the service based on a comparison of the first list to the second list,
   transmitting, in response to authenticating the device based on the comparison of the first list to the second list, a second network communication indicating that the device has been authenticated for accessing the service, and
   in response to determining that the first list includes a multicast group membership that is not included in the second list, transmitting a third network communication to indicate that additional credentials should be obtained from the device.

2. The apparatus of claim 1, wherein authenticating the device includes authenticating the device when the first list represents at least a subset of the second list.

3. The apparatus of claim 1, wherein the operations further include indicating that access to the service should be prevented in response to the first list including the multicast group membership that is not included in the second list.

4. The apparatus of claim 1, wherein the operations further include updating the first list to remove the multicast group membership that is not included in the second list.

5. The apparatus of claim 1, wherein a group membership of the first list identifying multicast group memberships of the device is associated with an attribute of the device.

6. The apparatus of claim 5, wherein the attribute is a geographic location of the device.

7. The apparatus of claim 6, wherein the geographic location is a prior geographic location and includes at least one of a distribution center, a manufacturing location, or a point of sale.

8. The apparatus of claim 5, wherein the attribute is a model of the device.

9. The apparatus of claim 5, wherein the group membership is an Internet Protocol version 6 multicast group.

10. A tangible computer-readable medium comprising instructions which, when executed, cause an apparatus to perform operations comprising:
   in response to receipt of a first network communication representing a request for a device to access a service, retrieving a first list identifying multicast group memberships of the device existing at a first time, the first list retrieved from a storage device based on an identifier in the first network communication, the first network communication including a second list identifying multicast group memberships of the device existing at a second time later than the first time;

authenticating the device for accessing the service based on a comparison of the first list to the second list;

transmitting, in response to authenticating the device based on the comparison of the first list to the second list, a second network communication indicating that the device has been authenticated for accessing the service;

in response to determining that the first list includes a multicast group membership that is not included in the second list, transmitting a third network communication to indicate that additional credentials should be obtained from the device.

11. The tangible computer-readable medium of claim 10, wherein the first time corresponds to a time at which the device first accessed the service.

12. The tangible computer-readable medium of claim 10, wherein an identity of the device is verified when the multicast group memberships of the first list are at least a subset of the multicast group memberships of the second list.

13. The tangible computer-readable medium of claim 12, wherein the operations further comprise indicating that access to the service should be prevented in response to the first list including the multicast group membership that is not included in the second list.

14. The tangible computer-readable medium of claim 13, wherein a group membership of the multicast group memberships of the first list is associated with an attribute of the device.

15. The tangible computer-readable medium of claim 14, wherein the attribute is a geographic location of the device.

16. The tangible computer-readable medium of claim 15, wherein the geographic location is a prior geographic location and includes at least one of a distribution center, a manufacturing location, or a point of sale.

17. A method of authenticating a device, the method comprising:

in response to receiving a first network communication representing a request for the device to access a service, retrieving, by an apparatus comprising a processor, a first list identifying multicast group memberships of the device existing at a first time, the first list retrieved from a storage device based on an identifier in the first network communication, the first network communication including a second list identifying multicast group memberships of the device existing at a second time later than the first time;

authenticating, by the apparatus, the device for access the service based on a comparison of the first list to the second list;

in response to authenticating the device based on the comparison of the first list to the second list, transmitting, by the apparatus, a second network communication indicating that the device has been authenticated for access the service; and in response to determining that the first list includes a multicast group membership that is not included in the second list, transmitting, by the apparatus, a third network communication to indicate that additional credentials should be obtained from the device.

18. The method of claim 17, wherein the first time corresponds to a time at which the device first accessed the service.

19. The method of claim 17, wherein an identity of the device is authenticated when the first list represents at least a subset of the second list.

20. The method of claim 17, further including indicating that access to the service should be prevented in response to the first list including the multicast group membership that is not included in the second list.

* * * * *